United States Patent [19]

Krux

[11] 4,453,693

[45] Jun. 12, 1984

[54] DAMPING DEVICE FOR MACHINE SETS HAVING A VERTICAL ROTOR SHAFT

[75] Inventor: Peter Krux, Dortmund, Fed. Rep. of Germany

[73] Assignee: Uhde GmbH, Dortmund, Fed. Rep. of Germany

[21] Appl. No.: 280,068

[22] Filed: Jul. 2, 1981

[30] Foreign Application Priority Data

Jul. 5, 1980 [DE] Fed. Rep. of Germany ....... 3025587

[51] Int. Cl.³ .......................................... F16M 13/00
[52] U.S. Cl. .................................... 248/559; 248/638
[58] Field of Search ............... 248/559, 562, 576, 575, 248/603, 604, 636, 638; 269/140.1

[56] References Cited

U.S. PATENT DOCUMENTS

| | | | |
|---|---|---|---|
| 1,491,736 | 4/1924 | Polk | 248/603 X |
| 1,970,740 | 8/1934 | Day | 248/603 X |
| 2,386,505 | 10/1945 | Puchy | 248/638 X |
| 3,322,379 | 5/1967 | Flannelly | 267/140.1 X |
| 3,337,165 | 8/1967 | Kondo | 248/559 |
| 4,150,588 | 4/1979 | Brewer | 248/638 X |
| 4,238,104 | 12/1980 | Hamilton | 248/638 X |

FOREIGN PATENT DOCUMENTS 3983 12/1977 Japan ................................. 248/636

*Primary Examiner*—J. Franklin Foss
*Attorney, Agent, or Firm*—Toren, McGeady and Stanger

[57] ABSTRACT

A device for damping vibrations in machine sets having a vertical rotor shaft including an annular cushioning element and springs resiliently supporting the cushioning element on the machine set. The springs may include vertically acting springs and horizontally acting springs which may be equally circumferentially distributed and adjustable.

3 Claims, 2 Drawing Figures

DAMPING DEVICE FOR MACHINE SETS HAVING A VERTICAL ROTOR SHAFT

The present invention relates generally to damping mechanisms and more particularly to a device for damping vibrations in machine sets having a vertical rotor shaft.

Machines of the type to which the present invention relates having a vertical rotor shaft may, for example, be vertical cooling water pumps or similar machines. In such devices, evaluation or calculation of vibration characteristics before assembly of the machine derived from instrument readings is frequently impossible or would otherwise require an unreasonable expediture. In the literature, for example "Mechanische Schwingungen" by J. P. Den Hartog, published 1952 by Springer Verlag, or VDW-Konstrukteur-Arbeitstagung, January 1969, WZL page 288 f.f., which relate to theoretical considerations, there are provided tentative solutions for vibration systems. However, these publications do not contain teachings which will enable one of ordinary skill in the art to cope with the complex vibration phenomena which occur in machine sets of the type referred to above.

The present invention is directed toward the provision of a solution enabling damping within permissible values of the vibration amplitudes in vertical machinery while permitting the installation of damping facilities after assembly of the machines. Furthermore, the invention enables machines which are already in plant service to be re-equipped with such facilities by relatively simple means.

SUMMARY OF THE INVENTION

Briefly, the present invention may be described as a damping mechanism of the type previously discussd which comprises an annular cushioning mass which is resiliently supported on the machine to provide the desired damping characteristics.

By a more specific aspect of the invention, the annular cushioning mass may be joined about the circumference of a machine housing by a first set of spring elements which will provide a vertically directed resilient damping force between the machine and the annular cushioning element and by a second set of spring elements which provide horizontally directed damping spring forces between the annular cushioning element and the machine housing.

The invention provides a particular advantage in that only a single cushioning element is required for vibration damping. The resilient suspension system and the annular design of the cushioning element combine to provide three degrees of freedom of movement for the cushioning element whereby the cushioning element is movable in a horizontal and in a vertical direction as well as about a vertical centerline. Thus, the cushioning element will be free to move in vibration planes not previously definable and it may be adapted to various planes of vibration while the machine is operating.

In accordance with a more specific feature of the invention, the annular cushioning element or mass is equipped with at least spring elements which are circumferentially equally spaced and which act in the horizontal direction and with at least three equally circumferentially spaced spring elements acting in the vertical direction.

The provision of such elements makes it possible for the cushioning mass to move in different planes of vibration and to operate at the same time to transfer the necessary impulses for damping to the machine by simple means. Spring elements which are capable of use with the present invention may include all applicable resilient suspensions. These may consist of supports of flexible materials of construction, for example, rubber pads, or of plate springs, spiral springs, or similar elements.

In a preferred embodiment of the invention, provision is made for the spring elements to be adjustably attached with the annular cushioning mass. This features permits tuning of the damping frequency of the device by simple means which will be effective even during operation of the machine. When the machine is stationary or not in use, the springs may be replaced by springs of different characteristics with subsequent adjustment in order to satisfy conditions which may be imposed by prevailing vibration behavior of the machine set.

The invention also provides holding members firmly attached to the machine operating to support at least the vertically acting spring elements. These holding members may, for example, be in the form of angle brackets or an angle-iron ring surrounding the housing of the machine and affixed thereto by welding, bolting or other means. In the case of spring failure, the holding member will prevent the cushioning mass from dropping or moving, thereby avoiding damage to the machine.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENT

Figure 1:
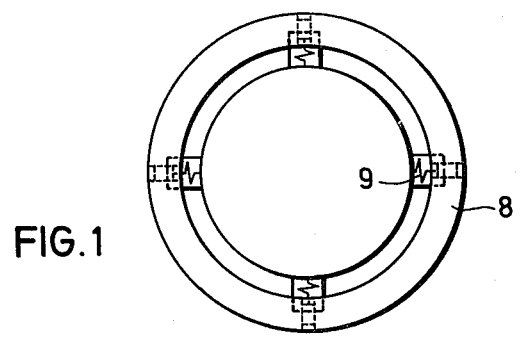
FIG. 1 is a simplified plan view of a machine set with a cushioning mass in accordance with the present invention.

Referring now to the drawing, an assembly in accordance with the present invention is depicted wherein a machine set 2 is placed in a vertical position upon a horizontal plane 1. The machine set as shown consists of a motor 3 with a flanged coupling section 4 and a machine 5, which may for example be a cooling water pump.

The upper part of the motor 3 is provided with a number of angle iron members 6 which are, for example, welded to the housing of the motor 3 and which serve as support or holding members for a series of vertical spring elements 7 arranged circumferentially spaced about the motor 3. An annular cushioning mass or element 8 is supported by the vertical spring elements 7 which are interposed between the annular cushioning element 8 and the angle iron members 6.

In addition to the first set of vertical spring elements 7, there is also provided a second or further set of spring elements 9 which are interposed between the annular cushioning mass 8 and the housing of the motor 3. The spring elements 9 act in a horizontal plane and provide a damping force in the horizontal direction between the annular cushioning mass 8 and the housing of the motor 3. Of course, the spring elements 9 may also be interposed between the cushioning element 8 and the angle iron members 6, if the members 6 are extended vertically beyond the location depicted in FIG. 2.

The horizontal spring elements 9 are adjustable by means of, for example, threaded or screwed elements 10 which extend through the cushioning mass 8. In the same manner, the spring elements 7 which are attached with the cushioning mass 8 may also be made adjustable by similar means, although this is not depicted in detail in the drawing.

Figure 2:
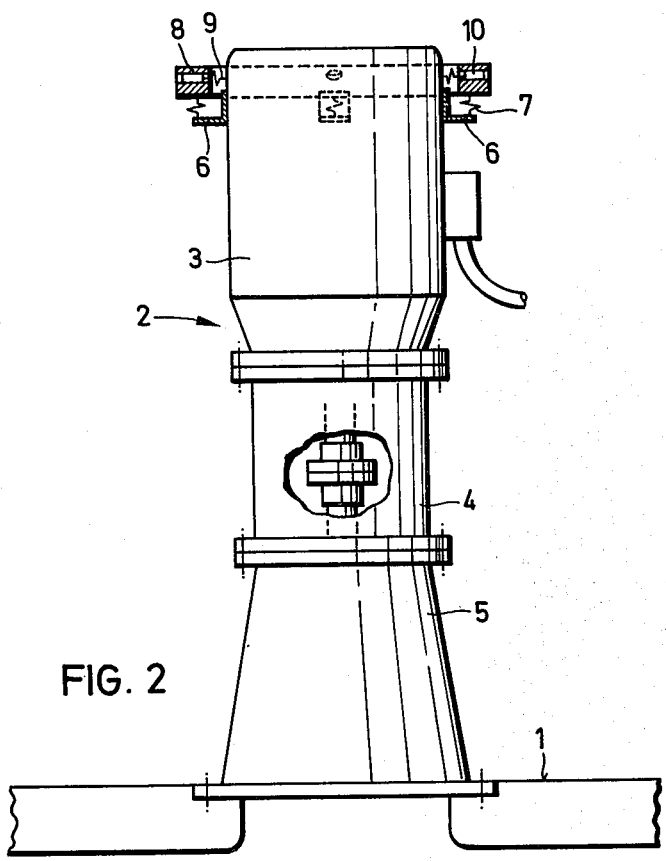
FIG. 2 is a simplified side elevation partially in section showing a machine with the cushioning mass of the invention.

It will be apparent to those skilled in the art that various modifications may be effected in the embodiment described without deviating from the spirit and scope of the invention. For example, instead of utilizing four pairs of spring elements 7, 9 as shown in FIGS. 1 and 2, provision may be made for three pairs of spring elements equally circumferentially spaced about the housing of the motor 3. Instead of arranging the spring elements in pairs, the elements may be attached to the cushioning mass 8 in a staggered pattern. The cushioning mass 8 may be composed of segments or it may consist of a continuous annular member. Additionally, the cushioning mass 8 may be provided with facilities for accommodating balancing elements (not shown). The spring elements may be formed as spiral springs or as plate springs, depending upon the arrangement of the cushioning mass. They may be of flexible plastic material or they may be formed as rubber blocks or similar elements. The holding member 6 arranged beneath the cushioning mass 8 may also be located above the cushioning mass. The cushioning mass may then be suspended from such members and it may be provided with limit stops which will prevent the cushioning mass from dropping below a particular point in the case of spring failure thereby to avoid damage to the equipment.

While a specific embodiment of the invention has been shown and described in detail to illustrate the application of the inventive principles, it will be understood that the invention may be embodied otherwise without departing from such principles.

What is claimed is:

1. A vibration damping system for a machine set having parts adapted for rotation about a vertical axis including a vertical rotor shaft and a machine housing which is generally vertically upstanding comprising:

cushioning mass means consisting essentially of resilient material arranged to extend annularly about said machine housing;

first spring means including means for enabling adjustment of the rigidity thereof connected between said machine housing and said cushioning mass means for applying a horizontally directed resilient connection therebetween;

second spring means resiliently suspending said cushioning mass means connected between said housing and said cushioning mass means providing a vertically directed resilient connection therebetween; and holding members attached to the sidewall of said machine housing arranged below said cushioning mass means to support at least said vertically directed second spring means.

2. A device according to claim 1 wherein said horizontally acting first spring means and said vertically acting second spring means comprise spring elements which are equally spaced about the circumference of said annular cushioning mass means.

3. A device according to claim 2 wherein said first spring means comprise at least three horizontally acting spring elements and wherein said second spring means comprise at least three vertically acting spring elements.

* * * * *